(12) United States Patent
Komamura et al.

(10) Patent No.: US 7,995,232 B2
(45) Date of Patent: Aug. 9, 2011

(54) DOCUMENT FILE MANAGEMENT APPARATUS, DOCUMENT FILE MANAGEMENT METHOD, AND DOCUMENT FILE MANAGEMENT PROGRAM

(75) Inventors: Noriyuki Komamura, Mishima (JP); Nobuhiro Shimogori, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1917 days.

(21) Appl. No.: 11/077,737

(22) Filed: Mar. 10, 2005

(65) Prior Publication Data

US 2006/0206809 A1     Sep. 14, 2006

(51) Int. Cl.
*G06K 15/00* (2006.01)
*G06F 3/12* (2006.01)
*H04N 1/46* (2006.01)

(52) U.S. Cl. ......... 358/1.16; 358/1.1; 358/403; 358/530

(58) Field of Classification Search ............... 358/1.1, 358/1.16, 403, 501, 530; 707/3
See application file for complete search history.

(56) References Cited

U.S. PATENT DOCUMENTS 6,704,775 B1 *   3/2004   Sato et al. ............... 709/219

FOREIGN PATENT DOCUMENTS

| JP | 5-54081 | 3/1993 |
| JP | 2004-240488 | 8/2004 |

* cited by examiner

*Primary Examiner* — Thomas J Lett
(74) *Attorney, Agent, or Firm* — Patterson & Sheridan, LLP

(57) ABSTRACT

Image data for printing corresponding to document data of all pages of each stored document file is produced in a vector form. Image data for printing corresponding to document data of a representative page of each stored document file is produced in a bitmap form. Moreover, each produced bitmap-form image data for printing is displayed while successively switched every document unit. Furthermore, each of the produced bitmap-form and vector-form image data for printing is displayed while successively switched every page unit.

19 Claims, 14 Drawing Sheets

| First document file management table 23a | | | | |
|---|---|---|---|---|
| Path | Size | Preparation time | Update time | Access time |
| C:¥folder1¥file1.txt | 2212 | 1/10 19:00 | 1/14 19:00 | 1/15 19:00 |
| C:¥folder2¥file2.doc | 2231 | 1/11 08:55 | 1/15 08:55 | 1/15 09:55 |
| C:¥folder3¥file3.ppt | 6045 | 1/12 16:32 | 1/12 16:32 | 1/12 16:32 |
| C:¥folder2¥file4.xls | 4536 | 1/14 10:06 | 1/19 10:06 | 1/19 11:22 |
| C:¥folder1¥file5.doc | 13268 | 1/14 14:33 | 1/19 14:33 | 1/21 18:33 |
| C:¥folder2¥file6.ppt | 4432 | 1/16 18:41 | 1/16 18:41 | 1/16 18:41 |
| C:¥folder3¥file7.doc | 22455 | 1/16 23:25 | 1/21 23:25 | 1/23 23:58 |
| C:¥folder2¥file8.txt | 8764 | 1/21 11:33 | 1/23 11:31 | 1/23 11:31 |
| C:¥folder1¥file9.ppt | 4353 | 1/12 12:43 | 1/12 12:43 | 1/22 12:43 |

FIG. 5

| Second document file management table 23b | | | | |
|---|---|---|---|---|
| Path | Size | Preparation time | Update time | Access |
| C:¥folder1¥file1.txt | 2212 | 1/10 19:00 | 1/14 19:00 | 1/15 19:00 |
| C:¥folder2¥file2.doc | 2231 | 1/11 08:55 | 1/15 08:55 | 1/15 09:55 |
| C:¥folder3¥file3.ppt | 6045 | 1/12 16:32 | 1/12 16:32 | 1/12 16:32 |
| C:¥folder2¥file4.xls | 4536 | 1/14 10:06 | 1/19 10:06 | 1/19 11:22 |
| C:¥folder1¥file5.doc | 13268 | 1/14 14:33 | 1/19 14:33 | 1/21 18:33 |
| C:¥folder2¥file6.ppt | 4432 | 1/16 18:41 | 1/16 18:41 | 1/16 18:41 |
| C:¥folder3¥file7.doc | 22455 | 1/16 23:25 | 1/21 23:25 | 1/23 23:58 |
| C:¥folder2¥file8.txt | 9000 | 1/21 11:33 | 1/23 12:01 | 1/23 12:01 |
| C:¥folder1¥file9.ppt | 4353 | 1/22 12:43 | 1/22 12:43 | 1/23 11:43 |
| C:¥folder3¥file10.doc | 3333 | 1/23 12:00 | 1/23 12:00 | 1/23 12:00 |
| C:¥folder4¥file11.xls | 2222 | 1/23 12:03 | 1/23 12:03 | 1/23 12:03 |

FIG. 6

Document management table (23c)

| Order | Document ID | State | Page number | Document date | File name (path) | Color ID |
|---|---|---|---|---|---|---|
| 1 | 1008 | Completed | 4 | 1/23 11:31 | C:¥folder2¥file8.txt | 2 |
| 2 | 1009 | Completed | 5 | 1/22 12:43 | C:¥folder1¥file9.ppt | 1 |
| 3 | 1007 | Completed | 6 | 1/21 23:25 | C:¥folder3¥file7.doc | 3 |
| 4 | 1005 | Completed | 1 | 1/19 14:33 | C:¥folder1¥file5.doc | 1 |
| 5 | 1004 | Completed | 5 | 1/19 10:06 | C:¥folder2¥file4.xls | 2 |
| 6 | 1006 | Completed | 7 | 1/16 18:41 | C:¥folder2¥file6.ppt | 2 |
| 7 | 1002 | Completed | 3 | 1/15 08:55 | C:¥folder2¥file2.doc | 2 |
| 8 | 1001 | Completed | 3 | 1/14 19:00 | C:¥folder1¥file1.txt | 1 |
| 9 | 1003 | Completed | 16 | 1/12 16:32 | C:¥folder3¥file3.ppt | 3 |

FIG. 7

Document management table (23c)

| Order | Document ID | State | Page number | Document date | File name (path) | Color ID |
|---|---|---|---|---|---|---|
| 1 | 1011 | Updated |  | 1/23 12:03 | C:¥folder4¥file11.xls | 4 |
| 2 | 1008 | Updated |  | 1/23 12:01 | C:¥folder2¥file8.txt | 2 |
| 3 | 1010 | Updated |  | 1/23 12:00 | C:¥folder3¥file10.doc | 2 |
| 4 | 1009 | Completed | 5 | 1/22 12:43 | C:¥folder1¥file9.ppt | 1 |
| 5 | 1007 | Completed | 6 | 1/21 23:25 | C:¥folder3¥file7.doc | 3 |
| 6 | 1005 | Completed | 1 | 1/19 14:33 | C:¥folder1¥file5.doc | 1 |
| 7 | 1004 | Completed | 5 | 1/19 10:06 | C:¥folder2¥file4.xls | 2 |
| 8 | 1006 | Completed | 7 | 1/16 18:41 | C:¥folder2¥file6.ppt | 2 |
| 9 | 1002 | Completed | 3 | 1/15 08:55 | C:¥folder2¥file2.doc | 2 |
| 10 | 1001 | Completed | 3 | 1/14 19:00 | C:¥folder1¥file1.txt | 1 |
| 11 | 1003 | Completed | 16 | 1/12 16:32 | C:¥folder3¥file3.ppt | 3 |

FIG. 8

| Document management table | | | | | | |
|---|---|---|---|---|---|---|
| Order | Document ID | State | Page number | Document date | File name (path) | Color ID |
| 1 | 1011 | Completed | 3 | 1/23 12:03 | C:¥folder4¥file11.xls | 4 |
| 2 | 1008 | Completed | 4 | 1/23 12:01 | C:¥folder2¥file8.txt | 2 |
| 3 | 1010 | Completed | 10 | 1/23 12:00 | C:¥folder3¥file10.doc | 2 |
| 4 | 1009 | Completed | 5 | 1/22 12:43 | C:¥folder1¥file9.ppt | 1 |
| 5 | 1007 | Completed | 6 | 1/21 23:25 | C:¥folder3¥file7.doc | 3 |
| 6 | 1005 | Completed | 1 | 1/19 14:33 | C:¥folder1¥file5.doc | 1 |
| 7 | 1004 | Completed | 5 | 1/19 10:06 | C:¥folder2¥file4.xls | 2 |
| 8 | 1006 | Completed | 7 | 1/16 18:41 | C:¥folder2¥file6.ppt | 2 |
| 9 | 1002 | Completed | 3 | 1/15 08:55 | C:¥folder2¥file2.doc | 2 |
| 10 | 1001 | Completed | 3 | 1/15 19:00 | C:¥folder1¥file1.txt | 1 |
| 11 | 1003 | Completed | 16 | 1/12 16:32 | C:¥folder3¥file3.ppt | 3 |

FIG. 9

| Color management table | | |
|---|---|---|
| Color ID | Color code | Folder name |
| 1 | #FFFF00 | C:¥folder1 |
| 2 | #00FFFF | C:¥folder2 |
| 3 | #FF00FF | C:¥folder3 |

FIG. 10

DOCUMENT FILE MANAGEMENT APPARATUS, DOCUMENT FILE MANAGEMENT METHOD, AND DOCUMENT FILE MANAGEMENT PROGRAM

BACKGROUND OF THE INVENTION

1. Field of the Invention

The present invention relates to a document file management apparatus, a document file management method, and a document file management program, which display image data for printing of document data in a large number of document files while successively switching the image data.

2. Description of the Related Art

A document file management apparatus is being developed which is capable of storing (registering) as document files a large number of document data prepared by various application programs and a large number of document data input from the outside, respectively.

In this document file management apparatus, it is demanded that image data for printing (e.g., bit map image data) can be produced from each document data of the stored document file, and the produced image data for printing can be displayed while successively switched in accordance with user's operation. When the respective image data for printing can be displayed while successively switched, one document file required by a user can be efficiently and quickly found out on a display screen.

BRIEF SUMMARY OF THE INVENTION

An object of one mode of the present invention is to provide a document file management apparatus capable of efficiently and quickly finding one document file required by a user from stored document files every document unit, and capable of easily processing displayed contents while displaying document data in the found document file every page unit.

According to one mode of the present invention, there is provided a document file management apparatus comprising:

storage means for storing document data of a plurality of documents each comprising at least one page as a document file for each document;

first producing means for producing, in a vector form, image data for printing corresponding to document data of all pages of each document file in the storage means;

second producing means for producing, in a bitmap form, image data for printing corresponding to document data of a representative page of each document file in the storage means in a bitmap form;

displaying means;

first controlling means for displaying in the displaying means each image data for printing of the bitmap form produced by the second producing means while successively switching the image data every document unit; and second controlling means for displaying in the displaying means each image data for printing of the bitmap form produced by the second producing means, and each image data for printing of the vector form produced by the first producing means while successively switching the image data every page unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 5 is a diagram showing a format of a first document file management table in one embodiment;

FIG. 6 is a diagram showing a format of a second document file management table in one embodiment;

FIG. 7 is a diagram showing a format of a document management table of a previous time in one embodiment;

FIG. 8 is a diagram showing a format of a document management table of a present time in one embodiment;

FIG. 9 is a diagram showing a format of a document management table after the number of pages is determined in one embodiment;

FIG. 10 is a diagram showing a format of a color management table in one embodiment;

DETAILED DESCRIPTION OF THE INVENTION

One embodiment of the present invention will be described hereinafter with reference to the drawings.

Figure 1:
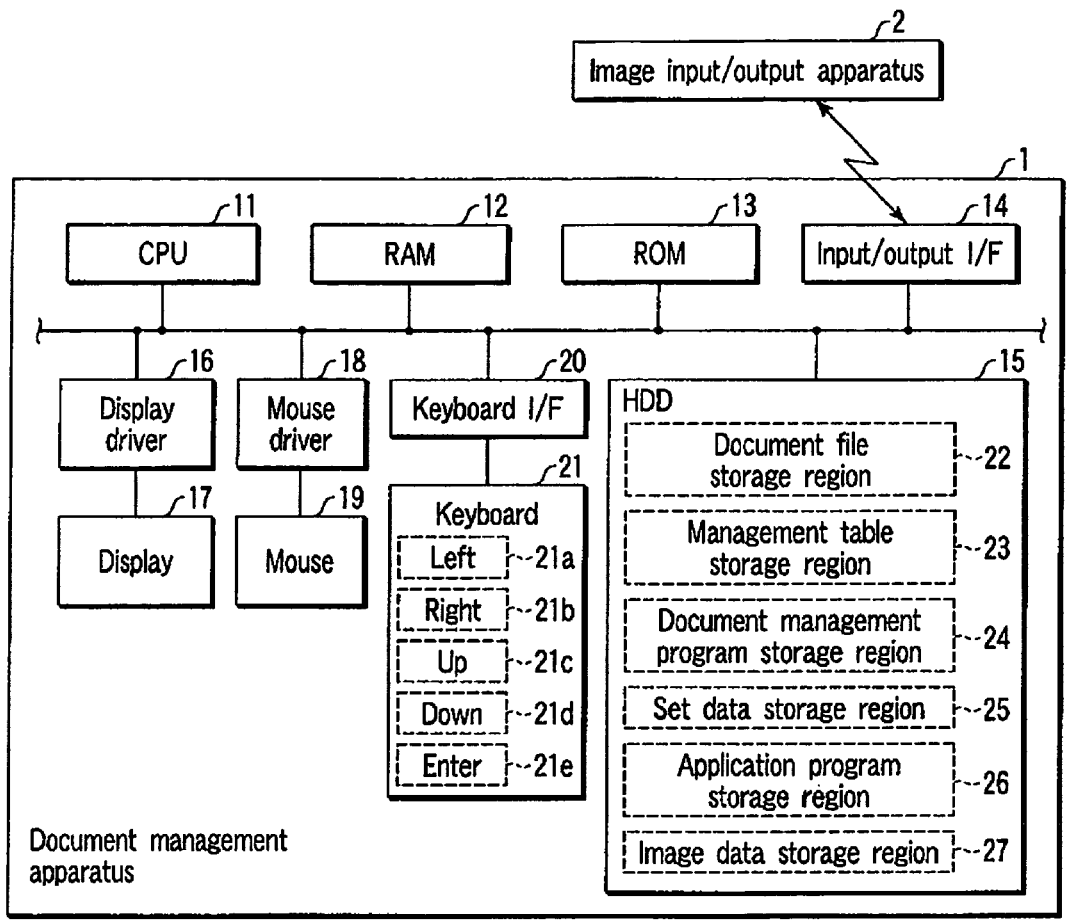
FIG. 1 is a block diagram showing a constitution of a document file management apparatus according to one embodiment.

As shown in FIG. 1, a document file management apparatus 1 is connected to an image input/output apparatus 2. Examples of the image input/output apparatus 2 include a scanner, a digital image forming apparatus (MFP), a digital camera, a computer (WWW server) on a network and the like.

The document file management apparatus 1 is, for example, a personal computer, and has: a CPU 11; a RAM 12; a ROM 13; an input/output interface (I/F) 14; a hard disk drive (HDD) 15; a display control circuit 16; a display 17; a mouse circuit 18; a mouse 19; a keyboard interface (I/F) 20; and a keyboard 21.

The CPU 11 executes various controls in accordance with an operation control program in the ROM 13, a document management program in the hard disk drive 15, and various application programs in the hard disk drive 15. The RAM 12 is temporary storage of data. The mouse 19 and the keyboard 21 are also input devices.

The input/output interface 14 exchanges the data between the document file management apparatus 1 an dh image input/output apparatus 2. The number of the input/output interfaces 14 is not limited to one, and a plurality of interfaces may be disposed.

In the hard disk drive 15, regions are secured: a document file storage region 22; a management table storage region 23; a document management program storage region 24; a set data storage region 25; an application program storage region 26; and an image data storage region 27.

A document file is stored in the document file storage region 22. In the file, a large number of document data are compiled in a file form for each document. In the management table storage region 23, tables are stored: a first document file management table 23a; a second document file management table 23b; a document management table 23c; and a color management table 23d. Among the tables, in the first document file management table 23a and the second document file management table 23b, document file management data is stored which manages each document file in the document file storage region 22. In the document management table 23c, document management data is stored which manages each document file in the document file storage region 22 every document unit. In the color management table 23d, color management data is stored which manages color assigned to each document file in the document file storage region 22.

In the document management program storage region 24, a document management program is stored, and the program is required for management (registration of document management data, production of image data for printing, display in the document searching screen, production of a document map, document searching, etc.) of the document file management apparatus 1. In the set data storage region 25, data is stored which defines fluctuation amount of a wheel 34 in the mouse 19. In the application program storage region 26, various application programs are stored for preparing document and for starting (opening) the document file.

In the image data storage region 27, an image data file for printing is stored. The file comprises image data (e.g., bitmap image data) for the printing, compiled in a file format for each page. The data is produced for each page from each document data of each document file in the document file storage region 22.

The display driver 16 drives the display 17. The mouse driver 18 detects movement of the mouse 19, button operation of the mouse 19, wheel operation of the mouse 19 and the like. The keyboard interface 20 detects various types of operations of the keyboard 21.

Figure 2:
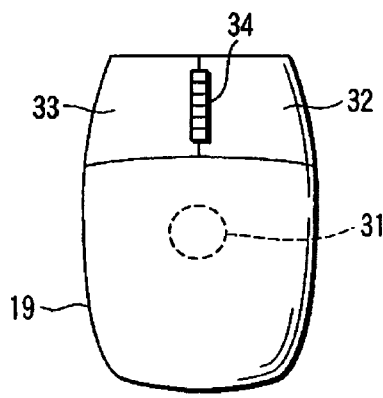
FIG. 2 is a diagram showing a constitution of a mouse in one embodiment.

A constitution of the mouse 19 is shown in FIG. 2.

The mouse 19 has an operation detection mechanism 31, a right button 32, a left button 33, the wheel 34 and the like, and is operated manually by a user in a state in which the mouse is laid on a flat surface. The user moves a main body of the mouse 19 on the flat surface, and operates the right button 32, left button 33, and wheel 34 of the mouse 19 if necessary. The operation detection mechanism 31 converts the movement of the mouse 19 on the flat surface into a signal. The mechanism comprises, for example, a spherical member which rotates in accordance with the movement of the mouse 19, and a sensor element which converts the movement of the spherical member into the signal. The right button 32 and the left button 33 are operated by user's fingers. The wheel 34 is rotated in a shown upper direction (referred to as a positive direction), and a shown lower direction (referred to as a reverse direction) by the user's fingers, and the wheel is pressed if necessary.

The keyboard 21 has, at least a left shift key 21a, a right shift key 21b, an up shift key 21c, a down shift key 21d, and an enter key 21e.

Next, display of each document managed by the document file management apparatus 1 will be displayed.

Figure 3:
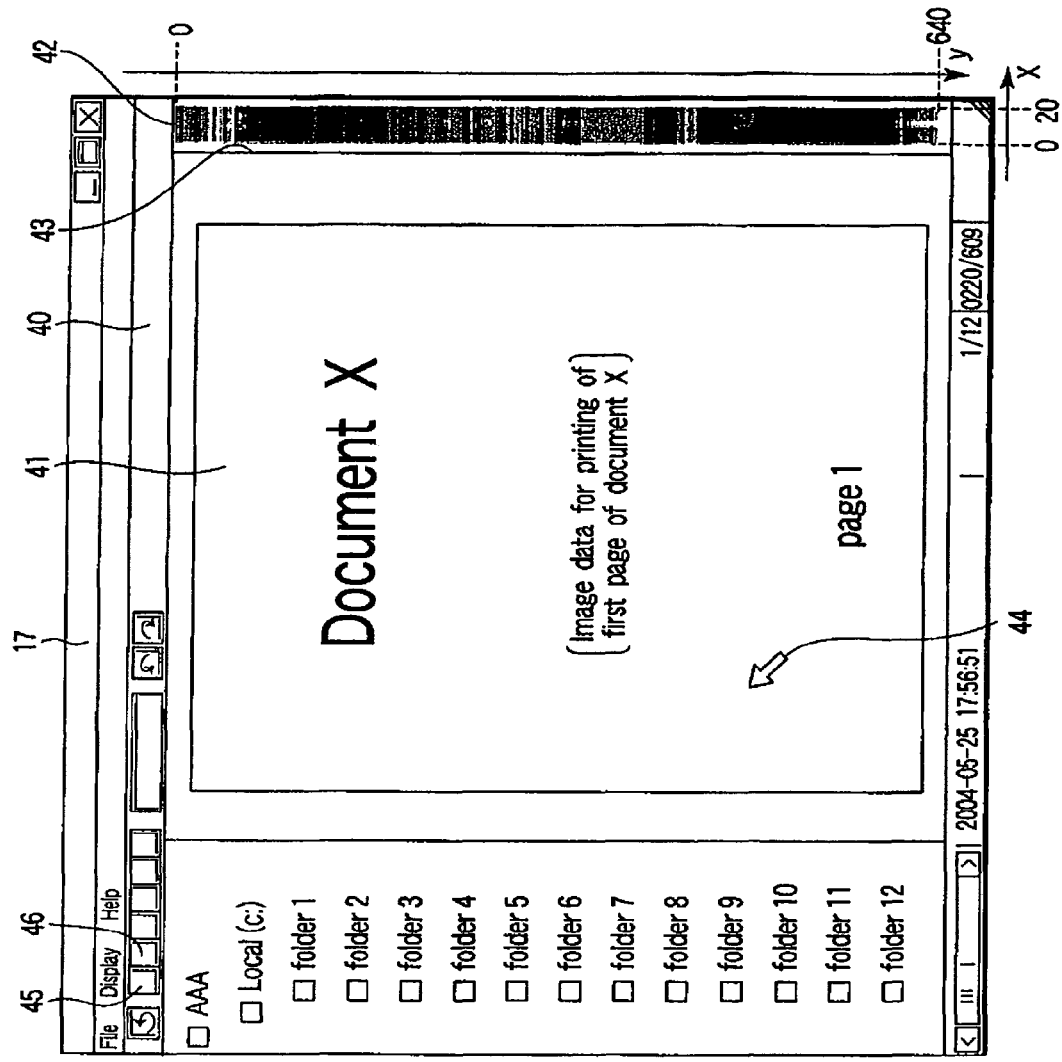
FIG. 3 is a diagram showing a document searching screen in one embodiment.

As shown in FIG. 3, a document searching screen 40 is displayed in the display 17 of the document file management apparatus 1. An image display region 41 is prepared substantially in a middle portion of the document searching screen 40. The image data for printing of one page is displayed in the image display region 41. This image data for printing corresponds to the document data of a first page in one document file.

Besides the image display region 41, a document map 42 is displayed in the document searching screen 40 together with an arrow (index) 43, a cursor 44, and various operation buttons. The various operation buttons are an enlarge button 45 and a reduce button 46.

In the document map 42, a large number of bars (transverse lines) corresponding to the respective document files are arranged in order of time series in a longitudinal direction, and the map is displayed in a right-end region of the document searching screen 40. An uppermost bar of the document map 42 corresponds to a newest document file having a latest document date (preparation date or update date). A lowermost bar of the document map 42 corresponds to an oldest document file having an oldest document date (preparation date or update date).

The arrow 43 moves vertically along an arrangement direction of the respective bars of the document map 42. This arrow 43 is an index indicating the bar among the respective bars of the document map 42, corresponding to the document file displayed in the image display region 41.

The cursor 44 moves on the document searching screen 40 in conjunction with the movement of the mouse 19. This cursor 44 is displayed, for example, in white.

Moreover, each bar of the document map 42 is colored. Colors differ with each folder stored in each document file. That is, a plurality of document files stored in the same folder are displayed in the same color. The plurality of document files are displayed in different colors, which are divided into a plurality of folders and stored. The user can intuitively recognize a difference between the folders in which the respective document files are stored by the color of each bar of the document map 42.

It is to be noted that the color which differs with extension of each document file may be set to each bar of the document map 42. Alternatively, the color which differs with the application program for starting each document file may be set to each bar of the document map 42.

Figure 4:
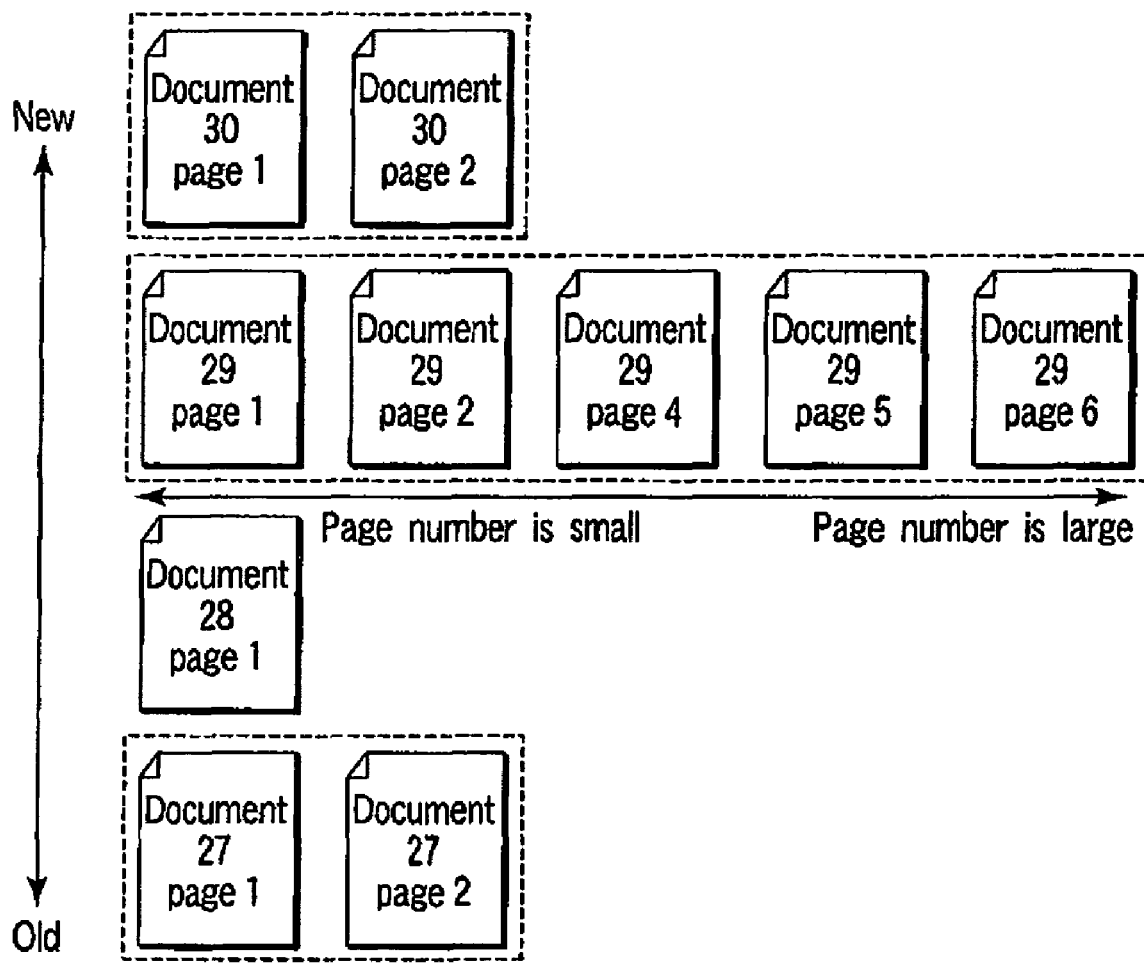
FIG. 4 is a diagram showing a display mode of each document in one embodiment.

Next, a display mode of each document will be described with reference to FIG. 4.

The respective documents are displayed in order of time series based on the document date (preparation date or update date), and in order of page number.

That is, in the image display region 41 of the document searching screen 40, the image data for printing corresponding to a representative page (e.g., first page) of each document is switched/displayed in such a manner as to be successively turned over in order of time series in accordance with a rotating operation of the wheel 34 of the mouse 19 or operation of the up/down shift keys 21c, 21d of the keyboard 21. In the image display region 41 of the document searching screen 40, the image data for printing of each page in one document is switched/displayed in such a manner as to be successively turned over in order of page number in accordance with operation of the left/right shift keys 21a, 21b of the keyboard 21.

Next, the document file storage region 22 and the management table storage region 23 in the hard disk drive 15 will be described.

A large number of document data prepared by each application program of the document file management apparatus 1 are stored as the document file for each document in the file storage region 22. Alternatively, a large number of document data input into the document file management apparatus 1 from the external image input/output apparatus 2 are stored in this manner. Each document file stored in the document file storage region 22 is managed by the document file management data of the first and second document file management tables 23a, 23b. Each file stored in the file storage region 22 is managed by the document management data of the document management table 23c every document unit. The color of each bar of the document map 42 in the document searching screen 40 is managed by the color management data of the color management table 23d.

A format of the first document file management table 23a is shown in FIG. 5, and that of the second document file management table 23b is shown in FIG. 6.

In the first and second document file management tables 23a, 23b, path, size, preparation date, update date, access date and the like are stored, respectively, as the document file management data.

The path is constituted of a name of a drive (drive name) in which a document file exists, a name (folder name) of a folder in which the document file exists, and a name (document file name) of the document file. The size is a data size of the document file. The preparation date is a date when the document file was prepared. The update time is a date when the document file was updated. The access date is a latest date among dates of the access to the document file.

The document file management data in the first document file management table 23a was prepared at the past time. The past time is the previous starting time of the document file management apparatus 1. The document file management data in the second document file management table 23b was prepared at the present time, and is successively updated or added.

For example, when the document file management apparatus 1 is started, the document file management data in the second document file management table 23b is simply stored in the first document file management table 23a. Accordingly, the document file management data in the second document file management table 23b is newly prepared (updated). In this case, the document file management data is stored concerning a newly added document file and an updated document file in the second document file management table 23b. That is, update situations (new registration or update) of the document file can be judged by a difference between contents of the first and second document file management tables 23a, 23b.

An example of the new registration of the document file will be described. This example relates to a case where a plurality of pages of document data are input into the document file management apparatus 1 via the input/output interface 14. In this case, the input document data is stored as a newly registered document file in the document file storage region 22 of the hard disk drive 15. At this time, with respect to the newly registered document file, new document file management data (path, size, preparation date, update date, access date) is added to the second document file management table 23b. It is to be noted that the contents of the first document file management table 23a are not changed.

Moreover, an example of the update of the document file will be described. The example relates to a case where the document file is updated which corresponds to one arbitrary document file management data in the second document file management table 23b. In this case, the updated document file is overwritten/stored in the document file before updated in the document file storage region 22 of the hard disk drive 15. Accordingly, the document file management data is also updated in the second document file management table 23b.

Next, the document management table 23c will be described. The formats of the document management table 23c are shown in FIGS. 7, 8, and 9.

In the document management table 23c, the document management data is stored to manage the document file managed by the first document file management table 23a every document unit. This document management data is constituted of an order, document ID, state, page number, document date, file name, and color ID.

A document management data order corresponds to a display order of each document in the document searching screen 40 of FIG. 3. The display order simply corresponds to the document date. The document ID is identification data inherent in each document. The state indicates update (including the new registration) waiting state, or update (including the new registration) completed state. The "update" indicates that the document has an update (including the new registration) waiting state. The "complete" indicates that the update (including the new registration) of the document has been completed. The page number is the number of pages of the document, and is determined when the state is "complete". The document date is the preparation date or update date of the document data, and the production or update date of the document file management data is used in the first document file management table 23a. The file name is constituted of a name (drive name) of a drive in which the document file exists, a name (folder name) of the folder in which the document file exists, and a name (document file name) of the document file. The color ID is identification data of the color assigned to each document. Correspondence between the color ID and actual color is designated by color management data in the color management table 23d.

Moreover, the document management data in the document management table 23c is updated by the registration of the document management data described later. For example, nine documents are managed in the document management table 23c shown in FIG. 7. It is assumed from the state that the document having document ID "1008" is updated, and documents having document IDs "1010" and "1011" are newly added. In this case, in the registration of the document management data described later, three document management data (document IDs "1008", "1010", "1011") whose states are set to "update" are registered with respect to the document management table 23c shown in FIG. 7. By this registration, the document management table 23c is prepared as shown in FIG. B.

In the document management table 23c shown in FIG. 8, three document management data having document IDs "1011", "1008", "1010" are brought into "updated" states. As to the document of each document management data brought into the "updated" state, images are successively produced as described later. When this image production is completed, the state of the document management data is rewritten into a "completed" state. That is, when the image production is completed with respect to three documents having the document IDs "1011", "1008", "1010", the document management table 23c of FIG. 8 is updated into the document management table 23c of FIG. 9.

It is to be noted that the number of pages of each document management data is determined in accordance with the number of image data for printing produced by the image production described later. Therefore, in the document management table 23c, as shown in FIG. 8, page-number columns of the document management data brought into the "updated" state are blank. When the "updated" state of the document management data is replaced with the "completed" state, as shown in FIG. 9, the number of the image data for printing produced by the image production described later is simply determined as the page number of the document management data.

Next, the color management table 23d will be described. A format of the color management table 23d is shown in FIG. 10.

The color management data is stored in the color management table 23d. The color management data is constituted of color ID, color code (code representing actual color), and folder name. As described above, the color of each bar of the document map 42 differs with the folder in which each document file exists. Therefore, the color ID and the color code are associated with the folder name. The color assigned to the folder in which each document file exists is judged by referring to the color management data.

Figure 11:
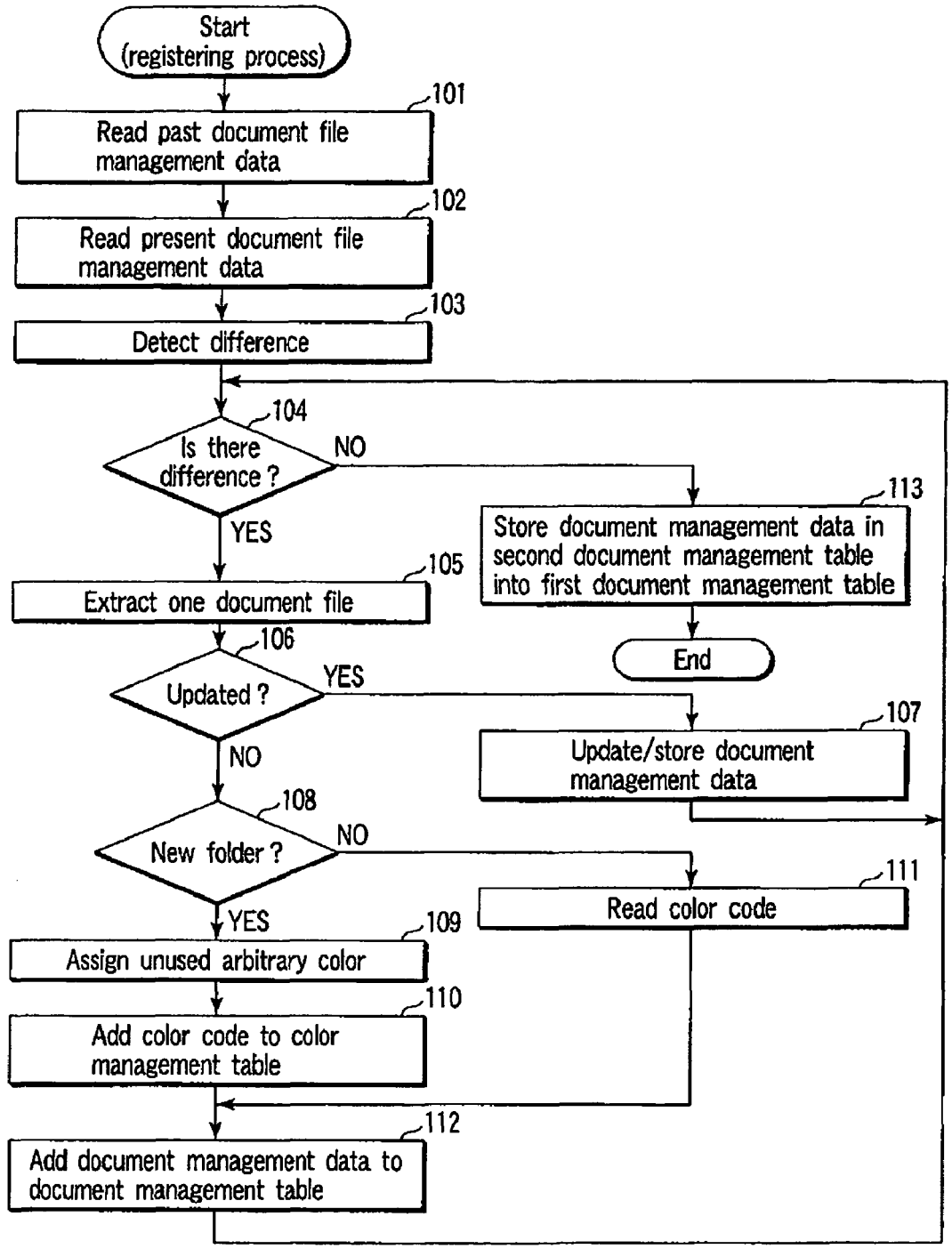
FIG. 11 is a flowchart showing a process of registration of document management data in one embodiment.

On the other hand, registration of the document management data will be described. FIG. 11 is a flowchart showing a registering process of the document management data.

A past (previous start time of the document file management apparatus 1) document file management data is read from the first document file management table 23a of the hard disk drive 15 at a starting time of the document file management apparatus 1 (starting time of the document management program) (step 101). Subsequently, the present document file management data is read from the second document file management table 23b of the hard disk drive 15 (step 102). Moreover, a difference is detected between the read past and present document file management data (step 103). A detected difference is temporarily stored in the RAM 12.

The detection of the difference is a step of extracting a document file updated from when preparing the past document file management data until the present document file management data is prepared, or a newly added document file.

For example, when an update date of a document file in the present document file management data is different from that of the document file in the past document file management data, the document file is recognized as the updated document file. When a document file does not exist in the past document file management data, and exists in the present document file management data, the document file is judged as the added document file.

That is, as differences between contents of the first document file management table 23a of FIG. 5 and those of the second document file management table 23b of FIG. 6, three document files are detected having document file names "file8.txt", "file10.doc", and "file11.xls".

As to the document file (document file name "file8.txt") whose path is "C:\folder2\file8.txt", the update date of the past time is different from that of the present time. Therefore, the document file having the document file name "file8.txt" is judged as the updated document file.

The document file (document file name "file10.doc") whose path is "C:\folder3\file10.doc", and the document file (document file name "file11.xls") whose path is "C:\folder4\file11.xls" exist only in the second document file management table 23b. Therefore, the document file whose document file name is "file10.doc", and the document file whose document file name is "file11.xls" are judged as newly added document files.

When one or a plurality of document files are detected as a difference (YES in step 104), one document file is extracted from the detected one or a plurality of document files (step 105).

When the extracted document file is the updated document file (YES in step 106), the document management data corresponding to the extracted document file is updated/stored into the document management table 23c (step 107). The steps performed before this update/storage are executed with respect to all the document files detected as the differences.

When the extracted document file is a newly added document file (NO in step 106), it is judged whether or not the newly added document file exists in a newly prepared new folder (step 108). When the newly added document file exists in the new folder (YES in step 108), an unused arbitrary color is assigned to the new folder (step 109). That is, a new color which is not assigned to the other folder is assigned to the new folder. Moreover, the color code of the assigned color is added to the color management table 23d together with the color ID and the folder name (step 110). Furthermore, the document management data corresponding to the newly added document file is added to the document management table 23c (step 112). The steps before this addition are executed with respect to all the added document files detected as the differences.

When the extracted document file is an added document file (NO in step 106), and the added document file exists in the existing folder (NO in step 108), the folder name of the existing folder is included in the color management data of the color management table 23d.

For example, the document file whose path is "C:\folder3\file10.doc" exists in a folder having a folder name "C:\folder3". This folder name "C:\folder3" is included in the color management data of the color management table 23d. Therefore, the folder having the folder name "C:\folder3" is judged as the existing folder. On the other hand, the document file having a path "C:\folder4\file11.xls" exists in a folder having a folder name "C:\folder4". The folder name "C:\folder4" is not included in the color management data of the color management table 23d. Therefore, the folder having the folder name "C:\folder4" is judged as a new folder.

In a case where a judgment result indicating the existing folder is obtained (NO of the step 108), the color code of the color assigned to the existing folder is read from the color management table 23d (step 111).

Moreover, the document management data corresponding to the newly added document file is added to the document management table 23c (step 112). The document management data corresponding to the newly added document file is produced by referring to the second document file management table 23b and the color management table 23d.

For example, an update time of the document file detected as the difference is used as a document time of the document management data. The path of the document file detected as the difference is used as the folder name of the document management data. A newly produced unique ID is used as a document ID of the document management data in order to distinguish the corresponding document from the existing document. As the color ID of the document management data, a color ID of the color is used which is assigned to the existing folder or the new folder in which the document file detected as the difference exists. Additionally, the page number of the document management data is not described (blank column). The document management data is set to the "updated" state. The page number is determined and described at a time when the image data for printing is produced by an image producing process described later.

When the document file is not detected as the difference, or the process is ended with respect to all the document files detected as the differences (NO in step 104), the document management data in the second document file management table 23*b* is stored in the first document file management table 23*a* (step 113).

Figure 12:
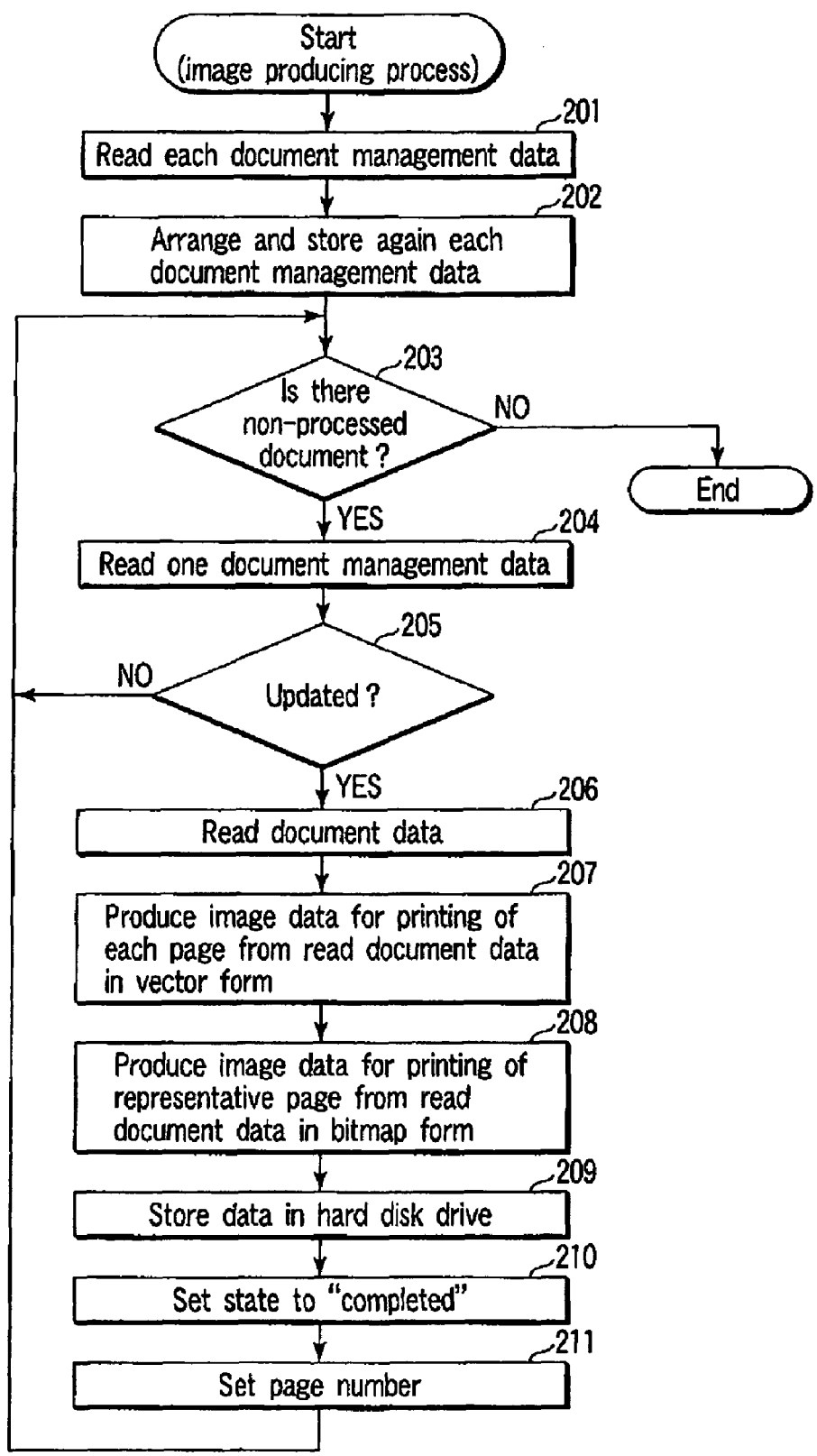
FIG. 12 is a flowchart showing an image producing process in one embodiment.

Next, an image producing process will be described with reference to a flowchart of FIG. 12.

In a storing process of the document management data, the document management data updated/stored and newly stored in the document management table 23*c* is brought into the "updated" state. With respect to the document brought into the "updated" state, the image data for the printing is not produced yet, and the image data for the printing does not have to be produced. The process of producing the image data for the printing will be referred to as an image producing process.

The image producing process is started, when the process of storing the document management data is completed. That is, all the document management data is read from the document management table 23*c* (step 201). The read document management data is arranged in order of a time series based on a document time of each document management data, and stored again in the document management table 23*c* (step 202). In the example shown in FIG. 8, three latest document management data are brought into "updated" states.

After arranging the respective document management data in the document management table 23*c*, it is judged whether or not a document exists which has not been subjected to the image producing process (step 203). In a case where the document exists which has not been subjected to the image producing process (YES in the step 203), the document management data corresponding to one document which has not been subjected to the image producing process is read from the document management table 23*c* (step 204). Moreover, it is judged whether or not the read document management data has been brought into the "updated state" (step 205).

When the "state" of the document management data is "updated" (YES in step 205), image data for printing of a document corresponding to the read document management data is produced as follows.

First, document data is read from the document file of the document corresponding to the read document management data (step 206). The image data for printing corresponding to each of document data of all pages is produced from the read document data in a vector form (referred to also as an outline form) (step 207). The image data for printing corresponding to each document data of a representative page (e.g., first page) of each document is produced from the read document data in a bitmap form (step 208).

The vector form indicates that an outline of a character or an image is drawn, and the inside of the character or the image is marked out. There is PDF data or the like as a representative example of the image data for printing of the vector form.

In the bitmap form, the character or the image is represented by a set of dots. Representative examples of the image data for printing of the bitmap form include JPEG data, PICT data, PNG data, BMP data, GIF data and the like.

As compared with the image data for printing of the bitmap form, the image data for printing of the vector form has advantages that a display speed is low, but a data amount is small, and processing such as enlargement, reduction, and deformation is easy.

As compared with the image data for printing of the vector form, the image data for printing of the bitmap form has advantages that the data amount is large, but the display speed is high.

Each produced image data for printing of the vector form is filed for each page, and stored in the image data storage region 27 of the hard disk drive 15 (step 209). Each produced image data for printing of the bitmap form is also filed for each representative page, and stored in the image data storage region 27 of the hard disk drive 15 (step 209).

After the storing, the "state" of the document management data is changed to the "completed" state in the document management table 23*c* (step 210). Furthermore, the number of the produced image data for each printing is determined as the page number. This page number is set as that of the document management data in the document management table 23*c* (step 211).

The process of the above-described steps 203 to 211 is successively executed with respect to all the documents managed in accordance with each document management data in the document management table 23*c*.

When the image producing process is completed with respect to all the documents managed by each document management data (NO in step 203), the "state" of all the document management data is set to the "completed" state in the document management table 23*c* as shown in FIG. 9.

Moreover, the produced image data for the printing is formed into the file for each page as described above. With respect to these files, a file name "document ID-page number.jpg" is produced which is constituted of the document ID and page number.

It is assumed that a document having a file name "C:\folder4\file11.xls" comprises document data for three pages in the document management table 23*c* of FIG. 8. In this case, image data for printing three files is produced with respect to the document having the file name "C:\folder4\file11.xls". It is to be noted that the document ID of the document having the file name "C:\folder4\file11.xls" is "1011".

Therefore, when the image data for printing three files is produced as described above, three file names are produced like "1011-001.jpg", "1011-002.jpg", and "1011-003.jpg" with respect to three files.

When the file names are produced in this manner, as shown in FIG. 9, the "state" is set to the "completed" state, and the "page number" is set to "three" with respect to the document management data of the data having the document ID "1011".

It is to be noted that in a case where there are many document management data having the "updated" state, or the number of pages is large with respect to the document management data having the "updated" state among the respective document management data in the document management table 23*c*, time required for the image producing process lengthens. Therefore, the image producing process may be executed in parallel with another process, for example, a process of displaying the document searching screen 40.

Figure 13:
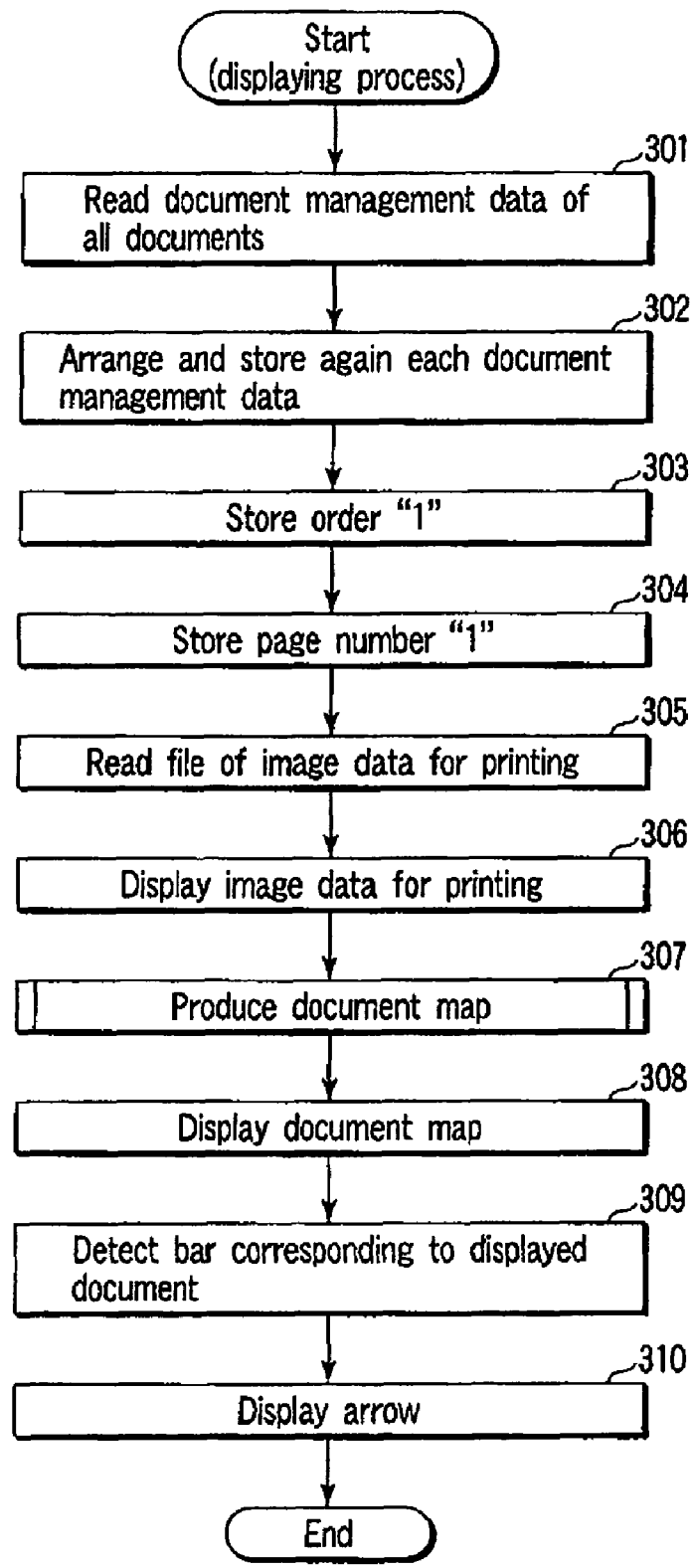
FIG. 13 is a flowchart showing a displaying process of a document searching screen in one embodiment.

Next, the displaying process of the document searching screen 40 will be described. FIG. 13 is a flowchart showing the displaying process of the document searching screen 40.

When the document searching screen 40 is displayed (started), first all the document management data is read in the document management table 23*c* (step 301). The read document management data is arranged in order of time series based on a document date of each document management data, and stored again in the document management table 23c (step 302).

After each document management data is arranged in the document management table 23c, data representing the document displayed in the document searching screen 40 is stored in the RAM 12. When the displayed document is the newest document, an order "1" of the document management data is stored as data indicating the newest document in the RAM 12 (step 303).

Furthermore, the data indicating the page displayed in the document searching screen 40 is stored in the RAM 12. When the page displayed in the document searching screen 40 is the first page, page number "1" of the document management data is stored in the RAM 12 (step 304).

The file of the image data for printing corresponding to the first page of the newest document is read from the image data storage region 27 of the hard disk drive 15 based on stored contents of the RAM 12 (step 305). That is, the document ID of the newest document (order "1") is extracted with reference to the document management table 23c. The file of the image data for printing corresponding to the first page of the newest document is read from the image data storage region 27 of the hard disk drive 15 based on the file name constituted of the extracted document ID and the page number "1" indicating the first page.

In the example of the document management table 23c shown in FIG. 9, "1011" is extracted as the document ID of the newest document (order "1"). A file name is "1011-001.jpg" constituted of this document ID "1011" and the page number "1" indicating the first page. The file of the image data for printing having this file name "1011-001.jpg" is read from the image data storage region 27 of the hard disk drive 15.

Moreover, the image data for printing of the read file is displayed in the image display region 41 of the document searching screen 40 (step 306). The document map 42 is produced in accordance with the display (step 307).

When the document map 42 is produced, the produced document map 42 is displayed in a right-end region in the document searching screen 40 (step 308). Among the respective bars of the document map 42, the bar is detected which corresponds to the document (image data for printing) displayed in the image display region 41 of the document searching screen 40 in accordance with the display (step 309). Moreover, the arrow 43 is displayed in a position corresponding to the detected bar (step 310).

Figure 14:
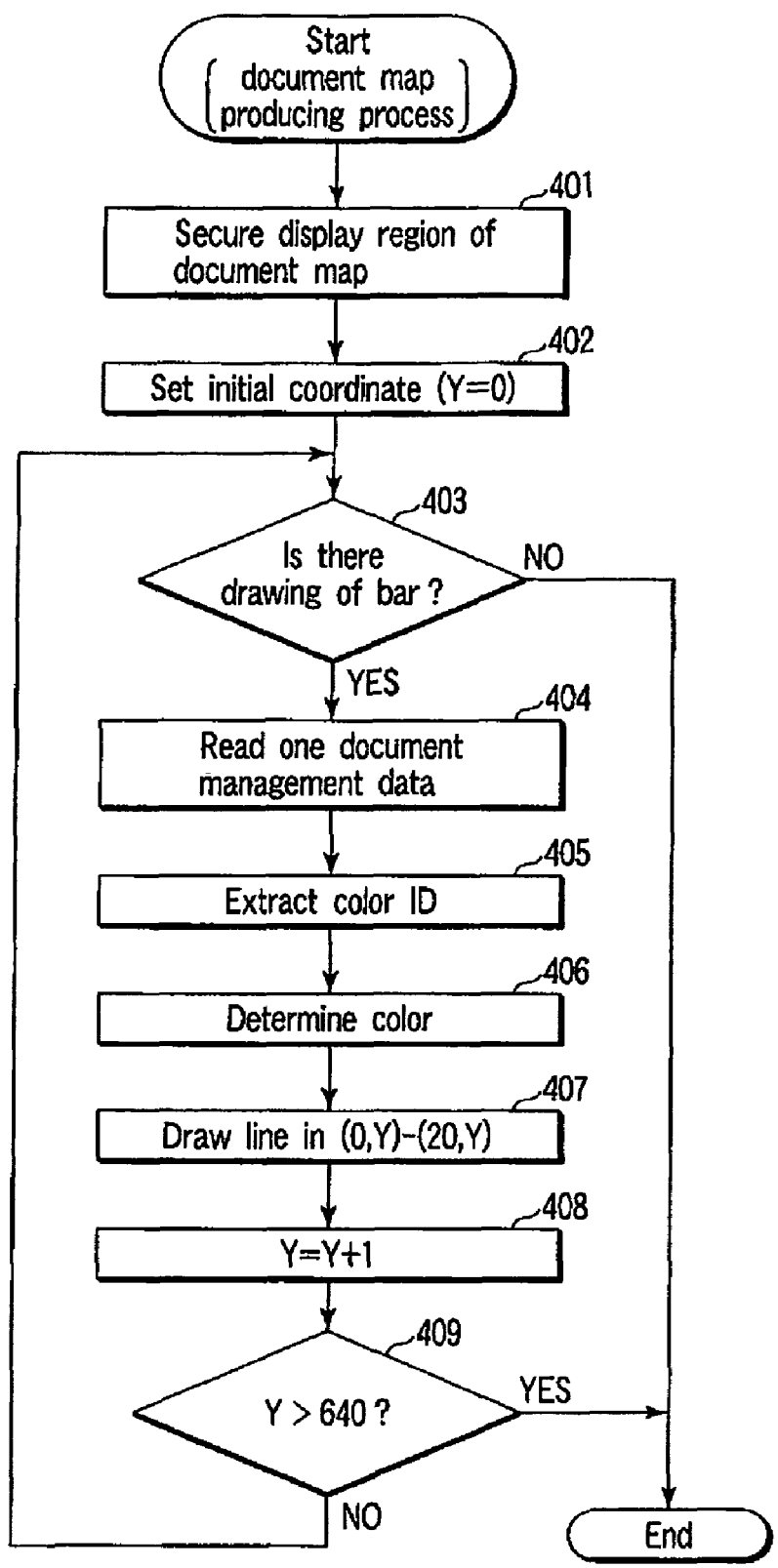
FIG. 14 is a flowchart showing a document map producing process in one embodiment.

Next, a document map printing process of the step 307 will be described. FIG. 14 is a flowchart showing the document map printing process.

First, a display region of the document map 42 is secured on the document searching screen 40 (step 401). When the display region is secured, a white image is displayed as an initial display color in the region of the document map 42.

As shown in FIG. 3, the display region of the document map 42 is an elongated rectangular region having a width of 20 pixels and a height of 640 pixels in a right end of the document searching screen 40. This rectangular region is surrounded with four points of X, Y coordinates (0, 0), (20, 0), (0, 640), (20, 640).

When the display region of the document map 42 is secured, Y=0 (Y coordinate "0") is set as an initial coordinate for starting drawing each bar (step 402). This initial coordinate corresponds to an uppermost end of the display region of the document map 42. The initial coordinate corresponds to an uppermost end of the display region of the document map 42.

After setting the initial coordinate, each document management data in the document management table 23c is referred to in an ascending order. The document (first document) of the document management data, having order "1", is a document in which any bar is not drawn in the display region of the document map 42, that is, a non-drawn document (YES in step 403). The document management data of the non-drawn first document is read (step 404). Moreover, the color ID of the read document management data is extracted (step 405). Furthermore, an actual color is determined which corresponds to the extracted color ID with reference to the color management table 23d (step 406). When the actual color is determined, a bar connecting two points of X, Y coordinates (0, 0) and (20, 0) is drawn in the display region of the document map 42 in the determined color (step 407). The drawn bar has a width (height) for one pixel in a Y-direction.

When the bar is drawn, "1" is added to a Y-coordinate value (step 408). Moreover, it is judged whether or not the Y-coordinate reaches "640" (step 409). The Y-coordinate "640" corresponds to a lowermost end of the display region of the document map 42.

When the Y-coordinate does not reach "640" (NO in step 409), the next document management data is referred to in the document management table 23c. A document (second document) of the document management data, having order "2", is a document in which any bar is not drawn in the display region of the document map 42, that is, a non-drawn document (YES in step 403). The document management data of the non-drawn second document is read (step 404). Moreover, the color ID of the read document management data is extracted (step 405). Furthermore, an actual color is determined which corresponds to the extracted color ID with reference to the color management table 23d (step 406). When the actual color is determined, a bar connecting two points of X, Y coordinates (0, 1) and (20, 1) is drawn in the display region of the document map 42 in the determined color (step 407). The drawn bar has a width (height) for one pixel in a Y-direction.

When the bar is drawn, "1" is added to the Y-coordinate value (step 408). Moreover, it is judged whether or not the Y-coordinate reaches "640" (step 409). The Y-coordinate "640" corresponds to a lowermost end of the display region of the document map 42.

When the Y-coordinate does not reach "640" (NO in the step 409), the next document management data is referred to in the document management table 23c. The bars of the document map 42 are successively drawn in this manner.

When the Y-coordinate reaches "640" (YES in the step 409), it is judged that the drawing of all the bars is completed, and the document map producing process ends.

Figure 15:
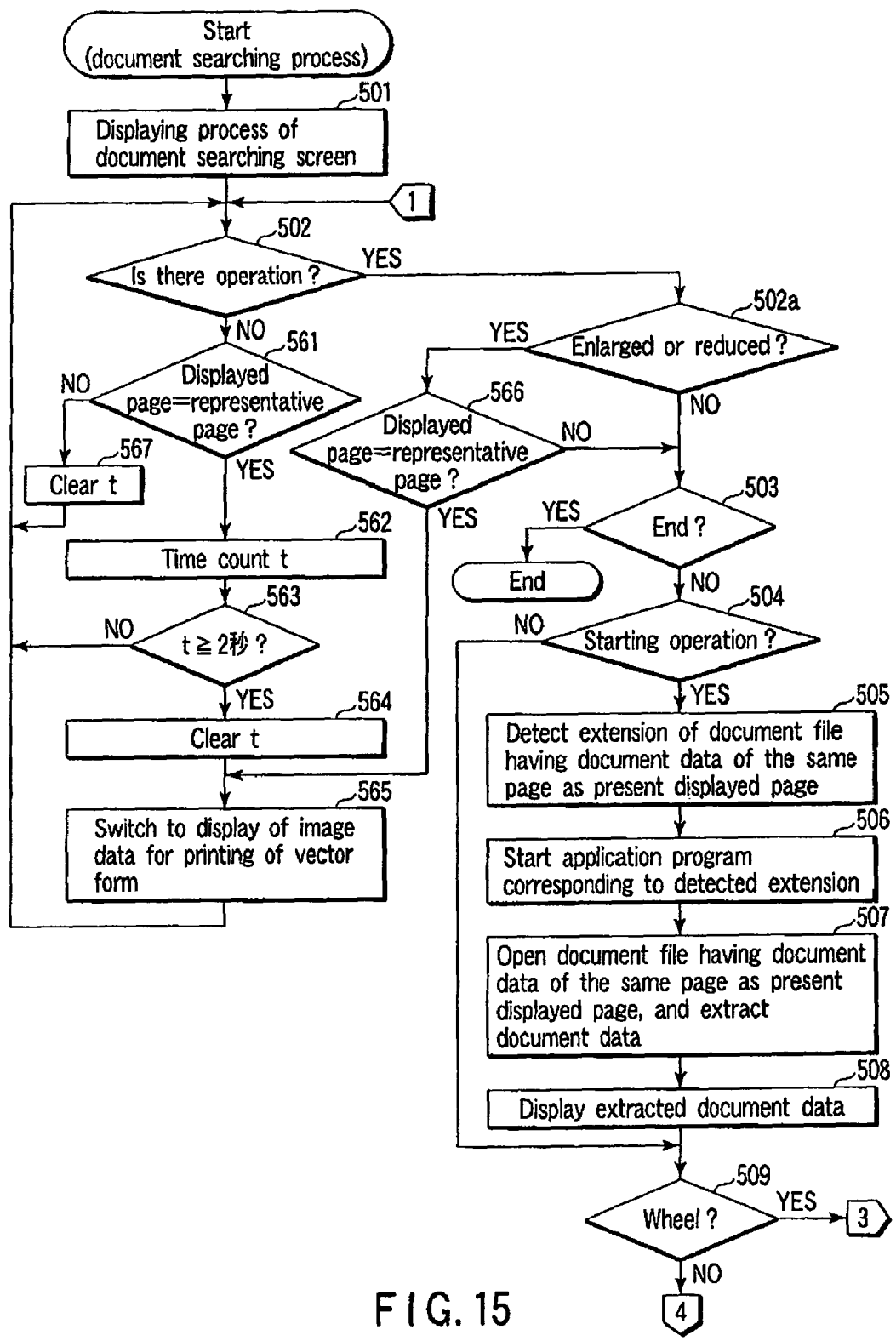
FIG. 15 is a flowchart showing a document searching process in one embodiment.
Figure 16:
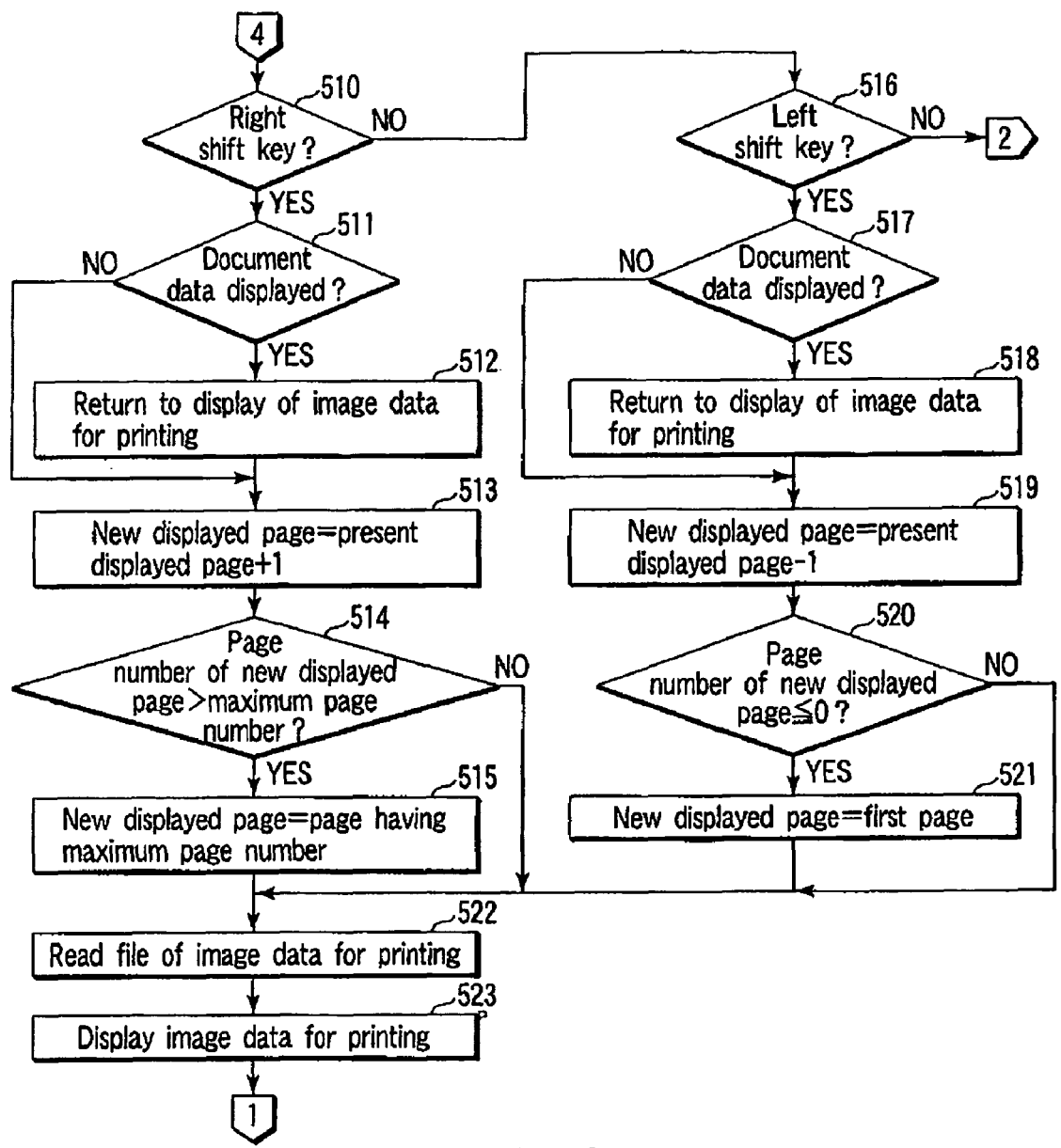
FIG. 16 is a flowchart continued from FIG. 15.
Figure 17:
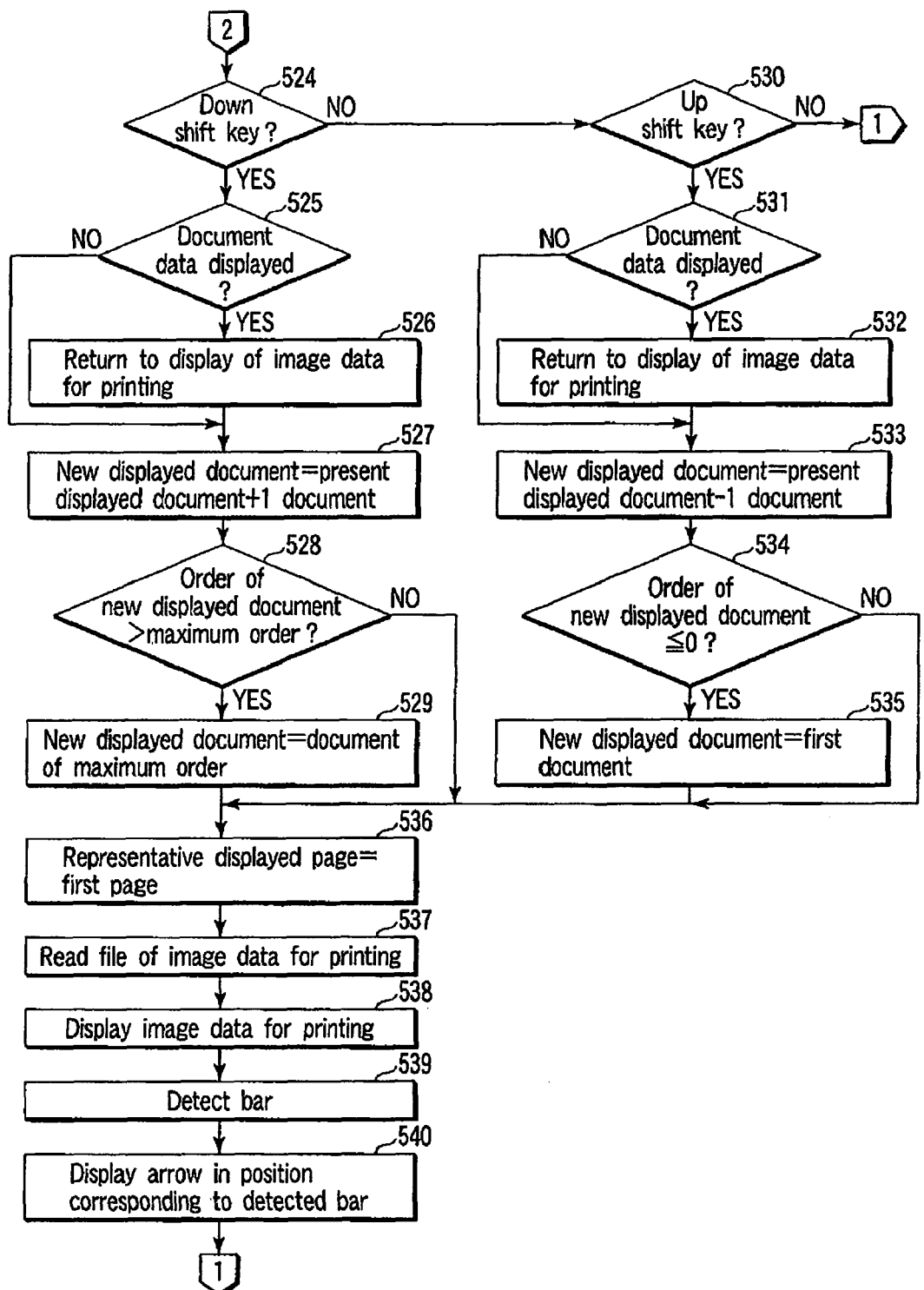
FIG. 17 is a flowchart continued from FIGS. 15 and 16.
Figure 18:
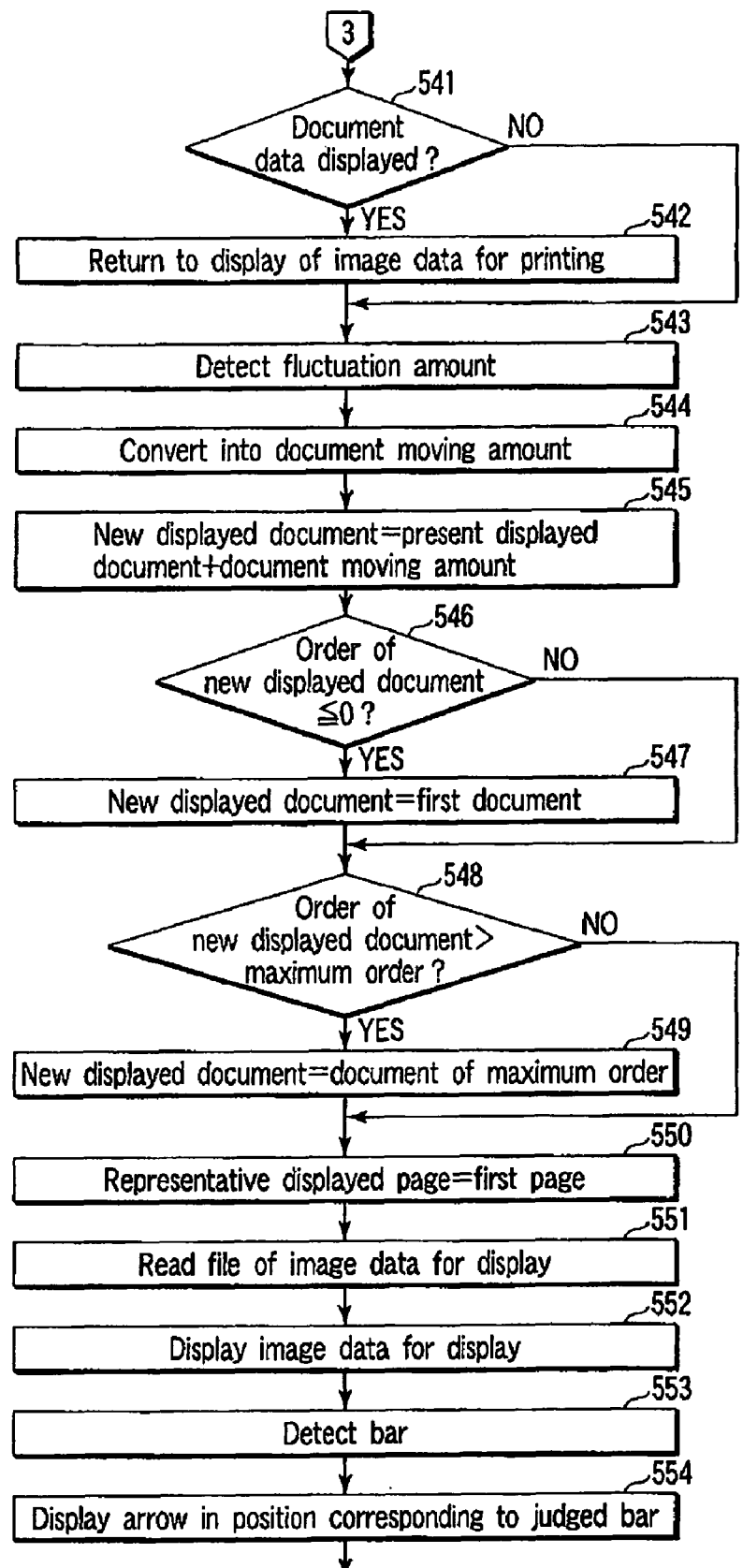
FIG. 18 is a flowchart continued from FIGS. 15, 16, and 17.

Next, a document search process will be described. FIGS. 15, 16, and 17 are flowcharts showing the document search process.

First, a displaying process of the document searching screen allows the document searching screen 40 of the display 17 to display the image data for printing of a first page (representative page) of the document data in a document file having a newest document time (step 501).

When the mouse 19 or the keyboard 21 is operated (YES in step 502), it is judged whether or not operation contents are enlargement or reduction (step 502a), and it is judged whether or not the operation contents indicate the end (step 503). When a judgment result does not indicate the enlargement or reduction (NO in step 502a), and indicates the end (YES in step 503), the document searching screen 40 of the display 17 is erased to end the operation.

When the judgment result does not indicate the enlargement or reduction (NO in step 502a), or does not indicate the end (NO in step 503), it is judged whether or not the operation is a starting operation of the document file (step 504). Examples of the starting operation of the document file include a pressing operation (e.g., double-click operation) of the left button 33 of the mouse 19, a pressing operation of the wheel 34 of the mouse 19, a pressing operation of the enter key in the keyboard 21 and the like.

When the operation is the starting operation of the document file (YES in step 504), extensions (doc, txt, xls, ppt, etc.) of the document file are detected having the document data of the same page of the present displayed page (image data for printing) in the document searching screen 40 (step 505). Moreover, the application program is started which corresponds to the detected extension among various types of application programs in the application program storage region 26 of the hard disk drive 15 (step 506).

When this application program is started, a document file is searched and opened having the document data of the same page as the present displayed page in the document searching screen 40 among the respective document files in the document file storage region 22 in the hard disk drive 15. Moreover, the document data of the same page as the present displayed page in the document searching screen 40 is extracted from the opened document file (step 507). The extracted document data is displayed in the present displayed page (image data for printing) on the present displayed page (image data for printing) in the document searching screen 40 (step 508).

A user can instantaneously display the document data of the same page as the present displayed page in the document searching screen 40 to appropriately edit the data. The user can overwrite and store the edited document data in the corresponding document file in the document file storage region 22 in the hard disk drive 15.

When the operation is not the starting operation of the document file (NO in step 504), it is judged whether or not the operation is an operation of the wheel 34 in the mouse 19 (step 509).

When the operation is not the operation of the wheel 34 in the mouse 19 (NO in step 509), it is judged whether or not the operation relates to the right shift key 21*b* in the keyboard 21 (step 510), whether or not the operation relates to the left shift key 21*a* in the keyboard 21 (step 516), whether or not the operation relates to the down shift key 21*d* in the keyboard 21 (step 524), and whether or not the operation relates to the up shift key 21*c* in the keyboard 21 (step 531), respectively.

When any of the shift keys 21*a*, 21*b*, 21*c*, 21*d* is not operated (NO in steps 510, 516, 524, 531), the process returns to the step 502 to wait for the operation.

When the right shift key 21*b* is pressed/operated (YES in step 510), it is judged whether or not the document data is displayed in the document searching screen 40 (step 511). When the document data is displayed (YES in step 511), the display of the document searching screen 40 is returned to that of the original image data for printing (bit map data) (step 512).

When the document data is not displayed (NO in step 510), data for one page is added to the present displayed page in the document searching screen 40 to set a new displayed page (=present displayed page+1 page) (step 513). Moreover, it is judged whether or not the page number of the set new displayed page exceeds the page number (maximum page number) of the document management data in the document management table 23*c* (step 514).

When the page number of the set new displayed page exceeds the page number (maximum page number) of the document management data in the document management table 23*c* (YES in step 514), the page having the page number (maximum page number) of the document management data is updated/set as the new displayed page (step 515). When the page number of the set new displayed page is not more than the page number (maximum page number) of the document management data in the document management table 23*c* (NO in step 514), the set new displayed page is valid as it is.

When the left shift key 21*a* is pressed/operated (YES in step 516), it is judged whether or not the document data is displayed in the document searching screen 40 (step 517). When the document data is displayed (YES in step 517), the display of the document searching screen 40 is returned to that of the original image data for printing (bit map data) (step 518).

When the document data is not displayed (NO in step 517), one page is subtracted from the present displayed pages in the document searching screen 40 to set new displayed pages (=present displayed pages−1 page) (step 519). Moreover, it is judged whether or not the page number of the set new displayed pages is 0 or less (step 520).

When the page number of the set new displayed page is zero or less (YES in step 520), the first page is updated/set as the new displayed page (step 521). When the page number of the set new displayed page is larger than zero (NO in step 520), the set new displayed page becomes valid as it is.

When the new displayed page is set, the document ID of the document is extracted which corresponds to the image data for printing displayed in the document searching screen 40 by collation of the order of the document corresponding to the image data for printing displayed in the document searching screen 40 with each document management data of the document management table 23*c*. The file of the image data for printing is read which corresponds to the new displayed page from the hard disk drive 15 based on the file name constituted of the extracted document ID and the page number of the set new displayed page (step 522). Moreover, the image data for printing of the read file is newly displayed in the document searching screen 40 (step 523). The displayed image data for printing is printed out by the external image input/output apparatus 2.

Thus, in a state in which the image data for printing of the arbitrary page of the arbitrary document is displayed by the pressing operation of the left/right shift keys 21*a*, 21*b*, there is a starting operation of the document file (YES in step 504), and then the document data of the same page as that of the image data for printing being displayed is displayed by the process of the steps 505 to 508 (step 508).

The user can efficiently and quickly find out one required document file, and can additionally instantaneously display and edit the document data of the desired page in the found document file.

When the down shift key 21*d* is pressed/operated (YES in step 524), it is judged whether or not the document data is displayed in the document searching screen 40 (step 525). When the document data is displayed (YES in step 525), the display of the document searching screen 40 is returned to that of the original image data for printing (bit map data) (step 526).

When the document data is not displayed (NO in step 525), one document is added to the present displayed document in the document searching screen 40 to set a new displayed document (=present displayed document+1 document) (step 527). Moreover, it is judged whether or not the order of the set new displayed document exceeds the maximum order of the document management data in the document management table 23*c* (step 528).

When the order of the set new displayed document exceeds the maximum order of the document management data in the document management table 23c (YES in step 528), the document (document having the oldest document time) having the maximum order of the document management data is updated/set as a new displayed document (step 529). When the order of the set new displayed document is not more than the maximum order of the document management data in the document management table 23c (NO in step 528), the set new displayed document is valid as it is.

When the up shift key 21c is pressed/operated (YES in step 530), it is judged whether or not the document data is displayed in the document searching screen 40 (step 531). When the document data is displayed (YES in step 531), the display of the document searching screen 40 is returned to that of the original image data for printing (bit map data) (step 532).

When the document data is not displayed (NO in step 531), one document is subtracted from the present displayed documents in the document searching screen 40 to set new displayed documents (=present displayed documents−1 document) (step 533). Moreover, it is judged whether or not the order of the set new displayed document is zero or less (step 534).

When the order of the set new displayed document is zero or less (YES in step 534), the document (document having the latest document time) having order "first" of the document management data is updated/set as the new displayed document (step 535). When the order of the set new displayed document is larger than zero (NO in step 534), the set new displayed document is valid as it is.

When the new displayed document is set, the first page is set as the representative displayed page of the new displayed document (step 536). When this representative displayed page is set, the document ID of the new displayed document is extracted by collation of the order of the new displayed document with each document management data of the document management table 23c. The file of the image data for printing corresponding to the representative displayed page is read from the hard disk drive 15 based on the file name constituted of the extracted document ID and the page number (first page) of the set representative displayed page (step 537). Moreover, the image data for printing of the read file is newly displayed in the document searching screen 40 (step 538). The displayed image data for printing can be printed out by the external image input/output apparatus 2.

When the first page of the new displayed document is displayed, the bar is detected which corresponds to the displayed document among the respective bars of the document map 42 (step 539). Moreover, the arrow 43 is displayed in a position corresponding to the detected bar (step 540).

Thus, there is a starting operation of the document file (YES in step 504) by the operation of the up/down shift keys 21c, 21d in a state in which the image data for printing of the arbitrary first page of the arbitrary document is displayed. Then, by the process of the steps 505 to 508, the document data of the same page as that of the image data for printing being displayed is displayed (step 508).

The user can efficiently and quickly find out one required document file, and can further instantaneously display and edit the document data of the first page in the found document file.

On the other hand, when the wheel 34 of the mouse 19 is rotated (YES in step 504), it is judged whether or not displayed contents of the document searching screen 40 are document data (step 541). When the document data (or the PDF data) is displayed (YES in step 541), the display of the document searching screen 40 is returned to that of the original image data for printing (bit map data) (step 542).

When the document data is not displayed (NO in step 541), fluctuation amount (rotation number) of the wheel 34 for a certain time is detected (step 543). When the fluctuation amount of the wheel 34 is detected, the fluctuation amount is converted into a document moving amount (step 544). The document moving amount corresponds to the number of documents which are switched to be displayed in the document searching screen 40.

For example, when the wheel 34 is rotated in a positive direction (upper direction of FIG. 2), a document moving amount indicates a plus value. When the document moving amount indicates the plus value, moving directions of a plurality of documents switched to be displayed in the document searching screen 40 correspond to movement of the document in an ascending "order". When the wheel 34 is rotated in a reverse direction (lower direction of FIG. 2), the document moving amount indicates a minus value. When the document moving amount indicates the minus value, the moving directions of a plurality of documents switched to be displayed in the document searching screen 40 correspond to the movement of the document in a descending "order".

When the document moving amount is obtained, the document moving amount is subtracted from the present displayed document in the document searching screen 40 to set a new displayed document (=present displayed document+document moving amount) (step 545). Moreover, it is judged whether or not the order of the set new displayed document is zero or less (step 546).

When the order of the set new displayed document is zero or less (YES in step 546), the document (document having a latest document time) having order "first") of the document management data is updated/set as a new displayed document (step 547).

When the order of the set new displayed document is larger than zero (NO in step 546), it is judged whether or not the order of the set new displayed document exceeds the maximum order of the document management data in the document management table 23c (step 548). When the order of the set new displayed document exceeds the maximum order of the document management data in the document management table 23c (YES of step 548), the document (document having an oldest document time) having the maximum order of the document management data is updated/set as the new displayed document (step 549). When the order of the set new displayed document is not more than the maximum order of the document management data in the document management table 23c (NO in step 548), the set new displayed document is valid as it is.

When the new displayed document is set, the first page is set as the representative displayed page of the new displayed document (step 550). When this representative displayed page is set, the document ID of the new displayed document is extracted by collation of the order of the new displayed document with each document management data of the document management table 23c. The file of the image data for printing is read which corresponds to the representative displayed page from the hard disk drive 15 based on the file name constituted of the extracted document ID, and the page number (first page) of the set representative displayed page (step 551). Moreover, the image data for printing of the read file is newly displayed in the document searching screen 40 (step 552). The displayed image data for printing can be printed out by the external image input/output apparatus 2.

When the first page of the new displayed document is displayed, the bar is detected which corresponds to the displayed document among the respective bars of the document map 42 (step 553). Moreover, the arrow 43 is displayed in a position corresponding to the detected bar (step 554).

It is to be noted that the process of the steps 550 and 551 may be performed in parallel with the process of the steps 547, 548, 549.

As described above, the image data for printing of the first page of each document data of each document file stored in the hard disk drive 15 is displayed while successively switched in the document searching screen 40 in accordance with the rotation of the wheel 34 in the mouse 19. Therefore, the document file required by the user can be efficiently and quickly searched from each document file stored in the hard disk drive 15.

There is a starting operation of the document file by the rotation of the wheel 34 in the mouse 19 in a state in which the image data for printing of the arbitrary first page of the arbitrary document is displayed (YES in step 504). Then, the document data of the same page as that of the image data for printing being displayed is displayed by the process of the steps 505 to 508 (step 508).

The user can efficiently and quickly find one required document file, and can further instantaneously display and edit the document data of the first page in the found document file.

The fluctuation amount and the document moving amount of the wheel 34 will be described.

A relation between the fluctuation amount (rotation number) of the wheel 34 and the document moving amount is stored as set data in the set data storage region 25 of the hard disk drive 15. These set data can be changed to arbitrary values by the user.

For example, it is assumed that the fluctuation amount for one rotation of the wheel 34 is "2880". In this case, when a document moving amount "1" is set with respect to fluctuation amount "1" of the wheel 34, the fluctuation amount for one rotation of the wheel 34 corresponds to the document moving amount "2880". That is, the image of the first page of each document displayed in the document searching screen 40 is switched 2880 times by one rotation of the wheel 34.

Additionally, in this setting, since a switching speed is excessively high with respect to the display of each document, it is difficult to search for the document. To solve the problem, for example, a document moving amount "1" may be set with respect to a fluctuation amount "120" of the wheel 34. In this case, the fluctuation amount for one rotation of the wheel 34 corresponds to the document moving amount "24". That is, the image of the first page of each document displayed in the document searching screen 40 is switched 24 times by one rotation of the wheel 34. Accordingly, the switching speed of the display of each document is satisfactory, and it is easy to search for the document.

Additionally, when the display of the document searching screen 40 is switched every document unit as described above, the bitmap-form image data for printing is displayed which corresponds to the document data of a first page in the document searching screen 40. The image data for printing of the bitmap form has a high display speed. That is, the switching of the display of the document searching screen 40 is speeded up. The user can efficiently find out one required document file at a high speed.

Moreover, when the display of the document searching screen 40 is switched every page unit as described above, the document searching screen 40 displays the bitmap-form image data for printing corresponding to the document data of the first page, and the vector-form image data for printing corresponding to the document data of each of second and subsequent pages. The vector-form image data for printing has a small data amount, and it is easy to enlarge, reduce, deform, or process otherwise the data.

The bitmap-form image data for printing is used as the image data for printing corresponding to the document data of the first page, and the vector-form image data for printing is used as the image data for printing corresponding to the document data of the second and subsequent pages in this manner. Accordingly, the searching for the document file at the high speed is compatible with the processing of the displayed contents like the enlarging, reducing, or deforming while reducing a storage capacity of the image data for printing occupying the hard disk drive 15 as much as possible.

When there is not any operation (YES in step 502), and the bitmap-form image data for printing is displayed which corresponds to the document data of the first page (representative page) in the document searching screen 40 (YES in step 561), time count t is executed (step 562). When the bitmap-form image data for printing is not displayed which corresponds to the document data of the first page (NO in step 561), the time count t is cleared (step 567).

When the bitmap-form image data for printing is displayed which corresponds to the document data of the first page, and the time count t reaches a certain time, for example, two seconds (YES in step 563), the time count t is cleared (step 564). Moreover, the bitmap-form image data for printing being displayed is replaced to display the vector-form image data for printing corresponding to the document data of the first page in the document searching screen 40 (step 565).

When the bitmap-form image data for printing is displayed which corresponds to the document data of the first page, and this state continues for two seconds or more in this manner, it is judged that the searching of the document file is once completed. Based on the judgment, the vector-form image data for printing is displayed for operations such as enlargement, reduction, and deformation by the user.

Moreover, when an enlarge button 45 or a reduce button 46 is turned on by cursor designation by the operation of the mouse 19 in the document searching screen 40 (YES in steps 502 and 502*a*), it is judged whether or not the bitmap-form image data for printing is displayed which corresponds to the document data of the first page in the document searching screen 40 (step 566).

When the bitmap-form image data for printing is displayed which corresponds to the document data of the first page (YES in step 566), the image data for printing being displayed is replaced to display the vector-form image data for printing corresponding to the document data of the first page in the document searching screen 40 (step 565). When the display is switched in this manner, the enlargement or reduction is possible.

When the bitmap-form image data for printing is not displayed which corresponds to the document data of the first page (NO in step 566), that is, vector-form image data for printing is displayed, the enlargement or reduction is possible without requiring the switching of the display.

It is to be noted that in the present embodiment, as the example, it has been described that the function of carrying out the present invention is recorded beforehand in the document file management apparatus 1, but the present invention is not limited to this example. The function of carrying out the present invention may be downloaded from the external network, and recorded in the document file management apparatus 1. Any mode of a recording medium may be used such as CD-ROM as long as the program can be stored and read. The function recorded in the document file management apparatus 1 may be realized in cooperation with an internal operating system (OS) or the like of the document file management apparatus 1.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general invention concept as defined by the appended claims and their equivalents.

What is claimed is:

1. A document file management apparatus comprising:
   a first storage section configured to store document data of a plurality of documents each comprising at least one page, as a document file for each document;
   a displaying section; and
   a CPU operative under program control, configured to first produce, in a vector form, image data for printing corresponding to document data of all pages of each document file in the first storage section,
   to second produce, in a bitmap form, image data for printing corresponding to document data of a representative page of each document file in the first storage section,
   to display in the displaying section each second produced image data for printing of the bitmap form while successively switching image data every document unit,
   to display in the displaying section each second produced image data for printing of the bitmap form while successively switching the image data every page unit, and to display in the displaying section each first produced image data for printing of the vector form while successively switching the image data every page unit.

2. The apparatus according to claim 1, further comprising:
   a second storage section configured to store each first and second produced image data for printing.

3. The apparatus according to claim 1, wherein
   the CPU is configured to replace the bitmap-form image data for printing being displayed in the displaying section with the vector-form image data for printing corresponding to the document data of the representative page in a case where the bitmap-form image data for printing is displayed which corresponds to the document data of the representative page in the displaying section, and this state continues for a time which is not less than a predetermined certain time.

4. The apparatus according to claim 1, wherein
   the CPU is configured to replace the bitmap-form image data for printing being displayed in the displaying section with the vector-form image data for printing corresponding to the document data of the representative page in a case where the bitmap-form image data for printing is displayed which corresponds to the document data of the representative page in the displaying section, and there is an operation to enlarge or reduce the bitmap-form image data for printing being displayed in this state.

5. The apparatus according to claim 1, wherein
   the CPU is configured to display in the displaying section each second-produced bitmap-form image data for printing while successively switching the image data every document unit in accordance with an operation to switch the document,
   to display in the displaying section each second produced bitmap-form image data for printing while successively switching the image data every page unit in accordance with an operation to switch the page, and to display in the displaying section each first produced vector-form image data for printing while successively switching the image data every page unit in accordance with the operation to switch the page.

6. The apparatus according to claim 5, wherein
   the CPU is configured to replace the bitmap-form image data for printing in the displaying section with the vector-form image data for printing corresponding to the document data of the representative page in a case where the bitmap-form image data for printing is displayed which corresponds to the document data of the representative page in the displaying section, and this state continues for a time which is not less than a predetermined certain time.

7. The apparatus according to claim 5, wherein
   the CPU is configured to replace the bitmap-form image data for printing being displayed in the displaying section with the vector-form image data for printing corresponding to the document data of the representative page in a case where the bitmap-form image data for printing is displayed which corresponds to the document data of the representative page in the displaying section, and there is an operation to enlarge or reduce the bitmap-form image data for printing being displayed in this state.

8. The apparatus according to claim 1, wherein
   the CPU is configured to extract from the first storage section the document data corresponding to the image data displayed in the displaying section to display the extracted document data in the displaying section.

9. The apparatus according to claim 1, further comprising:
   a keyboard comprising at least an up shift key, a down shift key, a left shift key, and a right shift key; and
   a mouse comprising at least a left button, a right button, and a wheel.

10. The apparatus according to claim 9, wherein
    the CPU is configured to display in the displaying section each second produced vector-form image data for printing while successively switching the image data every document unit in accordance with a pressing operation of the up and down shift keys in the keyboard,
    and to display in the displaying section each second produced vector-form image data for printing while successively switching the image data every document unit in accordance with a rotating operation of the wheel of the mouse.

11. The apparatus according to claim 1, further comprising:
    a document map in which a plurality of bars corresponding to the respective document files in the first storage section are arranged and which is displayed in the displaying section.

12. The apparatus according to claim 11, further comprising:
    an index indicating a bar corresponding to the document file corresponding to the image data displayed in the displaying section among bars of the document map while moving along an arrangement direction of the respective bars of the document map in the displaying section.

13. The apparatus according to claim 11, wherein
    the respective bars of the document map have mutually different colors.

14. A document file management method comprising:
    storing document data of a plurality of documents each comprising at least one page, as a document file for each document;

producing, in a vector form, image data for printing corresponding to document data of all pages of each document file;

producing, in a bitmap form, image data for printing corresponding to document data of a representative page of each document file;

displaying each produced image data for printing of the bitmap form while successively switching image data every document unit; and displaying each produced bitmap-form image data for printing and each produced vector-form image data for printing while successively switching the image data every page unit.

15. The method apparatus according to claim 14, further comprising:

replacing the bitmap-form image data for printing being displayed with the vector-form image data for printing corresponding to the document data of the representative page in a case where the bitmap-form image data for printing is displayed which corresponds to the document data of the representative page, and this state continues for a time which is not less than a predetermined certain time.

16. The method according to claim 14, further comprising:

replacing the bitmap-form image data for printing being displayed with the vector-form image data for printing corresponding to the document data of the representative page in a case where the bitmap-form image data for printing is displayed which corresponds to the document data of the representative page, and there is an operation to enlarge or reduce the bitmap-form image data for printing being displayed in this state.

17. A non-transitory computer-readable storage medium storing a computer program which causes a computer to execute a document file management method, the document file management method comprising:

storing document data of a plurality of documents each comprising at least one page, as a document file;

producing, in a vector form, image data for printing corresponding to document data of all pages of each document file;

producing, in a bitmap form, image data for printing corresponding to document data of a representative page of each document file;

displaying each produced image data for printing of the bitmap form while successively switching the image data every document unit; and displaying each produced bitmap-form image data for printing and each produced vector-form image data for printing while successively switching the image data every page unit.

18. The non-transitory computer-readable storage medium according to claim 17, wherein the document file management method further comprises:

replacing the bitmap-form image data for printing with the vector-form image data for printing corresponding to the document data of the representative page in a case where the bitmap-form image data for printing is displayed which corresponds to the document data of the representative page, and this state continues for a time which is not less than a predetermined certain time.

19. The non-transitory computer-readable storage medium according to claim 17, wherein the document file management method further comprises:

replacing the bitmap-form image data for printing being displayed with the vector-form image data for printing corresponding to the document data of the representative page in a case where the bitmap-form image data for printing is displayed which corresponds to the document data of the representative page, and there is an operation to enlarge or reduce the bitmap-form image data for printing being displayed in this state.

* * * * *